May 5, 1959

G. A. SIMA 2,885,211

COLLET

Filed May 7, 1958

INVENTOR.
GEORGE A. SIMA
BY
G. William Freeman
ATTORNEY

United States Patent Office 2,885,211
Patented May 5, 1959

2,885,211

COLLET

George A. Sima, Macedonia, Ohio

Application May 7, 1958, Serial No. 733,736

8 Claims. (Cl. 279—59)

This invention relates to the art of collets and in particular has reference to a new and improved type of collet wherein means are provided for effectively removing the collet from the holder after usage thereof.

In United States Letters Patent Number 2,272,185, issued on February 10, 1942, to Windsor N. Chittenden, there is disclosed a collet chuck of the general class herein being considered. The collet chuck of the above patent featured the use of a collet member having a double tapered external surface with one said tapered surface being seated in a complemental taper of the tool holder, while the other tapered surface was engaged by a compensator member that served to keep the collet in place in the seat during use.

While the collet of the above captioned United States patent operates satisfactorily during usage, it has been found in the past that removal of the same is oftentimes difficult because of the fact that the collet becomes tightly seated within the seat of the tool holder during usage. Accordingly, it has not been possible in the past to effectively remove a collet of this type from the tool holder seat within which the same was seated without considerable difficulty.

In this regard, it has been proposed in the past to provide an interlocking arrangement between the collet member and the nut member associated therewith so that upon unthreading, or backing off, of the tightening nut, the collet becomes automatically shifted axially of the tool holder so as to become unseated. While devices of this type have, in some instances, performed satisfactorily, it is, of course, manifest that such devices of this type require a modified form of collet member, with the result that existing collet structures cannot be adapted to include this interlocking feature.

Additionally, it is believed manifest that collets of this special type would require special machining, and accordingly, would not be interchangeable with standard collets now in use. As a result, a separate supply of such collets would have to be maintained at all times, with the result that the practical value of such collets is materially reduced.

In copending application, Serial No. 689,444, filed October 10, 1957, by George A. Sima, there was disclosed a device wherein a mechanical interlocking of a releasable nature was achieved, even though standard collets of the type set forth in the above referred to Chittenden patent were employed. In this copending application, the conventional adjustment nut was modified to include a radial inwardly projecting ring that complementally and frictionally engaged one tapered surface of the Chittenden type collet when the same had a tool received therein. In this manner, the positioned tool operated to prevent radial collapse of the gripping jaws of the collet, with the result that axial shifting of the adjustment nut operated to automatically unseat the collet with respect to the tool holder due to the interference between the radial ring and the uncollapsible collet per se.

While this improved device has met with widespread acceptance up to the present time, it has been further found that the above discussed original concept, while being satisfactory for use with any size collet, was not susceptible to interchangeable use with one or more types of collets. Specifically, it is oftentimes necessary that the same holder be used with more than one collet size as in the past, and prior to the use of the improvements taught in the above referred-to copending application, reducing collets were merely seated within each other to effectively adapt the tool holder to use with an undersize collet, as for example by telescoping a smaller size collet within a larger size adaptor collet.

While the use of reducing adaptors worked perfectly well with ordinary collets, it was found that the same would not function in connection with a locking ring of the type disclosed in the above referred-to copending application because of the fact that no provision was made to lock the adaptor unit in place to prevent shifting.

It accordingly becomes the principal object of this invention to provide an improved type of self-releasing collet that is characterized by the fact that adaptor portion of the same can interchangeably receive a plurality of different size and diameter collets therein, with all collets received therein being retained in place by the locking ring and further being automatically ejected upon unloosening of the locking nut.

Other objects of the invention will become more apparent upon a reading of the following brief specification considered and interpreted in the light of the accompanying drawings.

Figure 1:
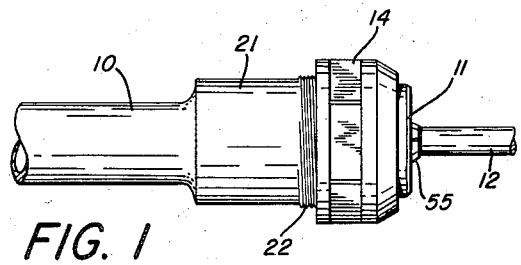
Figure 1 is an elevational view of the improved collet.

Referring now to the drawings and in particular to Figure 1 thereof, there is shown an adaptor unit 10 that concentrically receives therein collet means 11, with the collet means 11 in turn receiving and gripping a tool 12 that is locked in place with respect thereto upon movement of a locking ring 14; the arrangement being such that the tool 12 will be concentric with the axis of rotation of the machine tool spindle (not shown) with the member 10 being received therein in known fashion.

Figure 2:
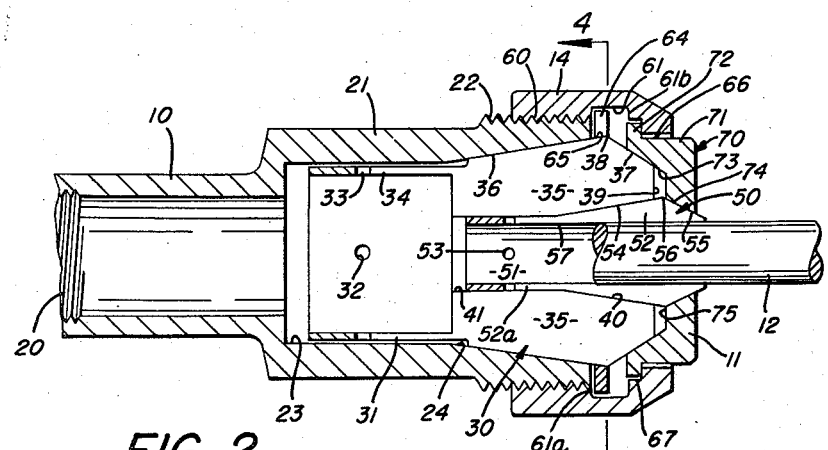
Figures 2 and 3 are sectional views showing the collet means seated and unseated respectively with respect to the adaptor member.
Figure 3:
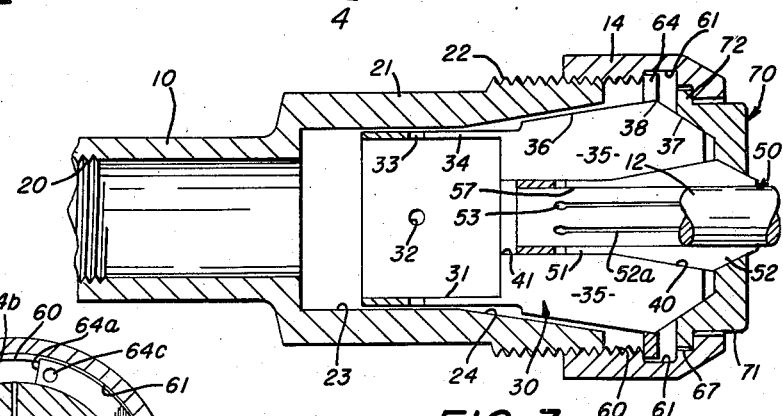

In this regard, and first considering the structure of the adaptor 10, it will be understood that the same is internally threaded as at 20 for reception around the threaded end of the machine tool spindle and in this manner, the member 10 can be releasably secured to the machine tool spindle and locked in place thereon in known manner. Additionally, and as shown in Figures 1, 2 and 3, the member 10 further includes an enlarged head portion 21 that is externally threaded as at 22 for the purpose of receiving the locking nut 14 as will hereinafter be described. For the purpose of releasably connecting with the collet 11 as best shown in Figures 2 and 3, the head 21 is further provided with a counterbore 23 that terminates at one axial end thereof in a tapered surface 24; with this surface 24 serving as a seat for adaptor collet 30, as will be described.

Considering now the structure of the collet 30, it will be seen that the same has a cylindrical skirt portion 31 that is provided with appropriate apertures 32 and 33 with the aperture 33 preferably defining axially extending slots 34 that, in turn, define a series of gripping jaws 35, 35. In this regard, the construction of the collet to this point is conventional and corresponds to the type of collet set forth in Chittenden Patent Number 2,272,185, with each jaw 35 having convergent tapered surfaces 36 and 37 that join at a maximum diameter point 38 and with surface 36 being complemental to surface 24 so as to effectuate seating therein. Additionally, and as best shown in Figures 2 and 3, the surface 37 terminates at axial end 39, with this end surface 39 also defining one axial end of an internal tapered seat 40 that extends axially of adaptor collet 30 and terminates at its other axial end in a cylindrical bore 41, with the angle of taper of the surfaces 40, 36 and 24 all being the same.

Within the just described collet member 30 there is concentrically telescoped a second collet member indicated generally by the numeral 50, with this collet member 50 also being of smaller diameter and including a skirt 51 and a series of gripping jaws 52, 52 that extend outwardly from apertures 53, 53 in skirt 51, with the gripping jaws being separated by a series of slots 52a, 52a that extend axially from apertures 53, 53. As before, the collet 50 is of the double taper type so as to include, in addition to skirt 51, tapered surfaces 54 and 55 that meet in an extreme diameter point 56, with the entire collet having an internal bore 57 within which the tool 12 may be received as shown in Figure 2 of the drawings. Also, it is to be understood that the surface 54 is complemental to the tapered seat 40 of collet member 30 so as to permit concentric seating with the collet 50 with respect to the collet 30.

Figure 4:
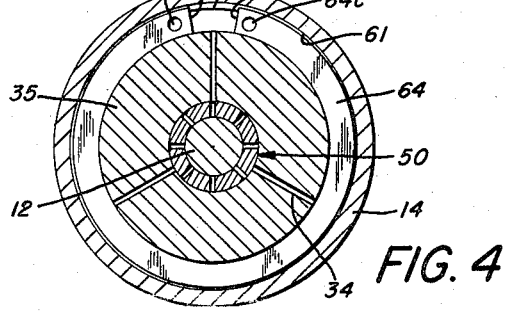
Figure 4 is a view taken on the lines 4—4 of Figure 2.

Considering next the structure of the locking nut 14, it will be seen that the same is of general cylindrical configuration so as to include internal thread 60, that terminates at the internal extremity thereof in an undercut bore 61, with the axial extremities of the undercut 61 being defined by shoulders 61a and 61b. Receivable within the just described undercut 61 is a ring 64 having its radially innermost peripheral edge defined by a tapered beveled surface 65 that is preferably complemental to the surface 36 of the collet as clearly shown in Figure 2 of the drawings. The ends 64a and 64b of ring 64 (Figure 4) shown spaced from each other so that upon insertion of a proper tool (not shown) in apertures 64c, 64c, the ring 64 can be radially collapsed to permit removal or insertion thereof in undercut 61.

Also carried by the nut 14 is a compensator ring indicated generally by the numeral 70, with this compensator ring 70 having an external cylindrical surface 71 received in bore 66 of ring 14 with flange 72 being received in an appropriate undercut 67 that is provided internally of the ring 14 as clearly shown in Figures 2 and 3. Also, and for the purpose of coacting with the collet members 30 and 50, the compensator nut 70 has internal tapered surfaces 73 and 74 that respectively seat and engage with the tapered surfaces 37 and 55 of collets 30 and 50 with these surfaces being interconnected by radial wall 75 as shown best in Figures 2 and 3.

In use or operation of the improved self-releasing collet, it is merely necessary that the collet 50 be concentrically seated within the collet 30, at which time the assembled collets 30 and 50 can be axially telescoped with respect to the nut 14. During this axial telescoping some force will be required to snap the extreme diameter point 38 of collet 30 beyond the bevelled edge surface 65. When this has been accomplished and the parts have been snapped to the position of Figure 2, the entire assembly of collets 30 and 50, and nut 14 may be concentrically telescoped within adaptor 10, with threaded engagement being made between threads 22 and 60. At this time, the tool 12 may be positioned in the bore 57 of collet 50, and upon tightening of the nut 14, the surfaces 73 and 74, acting against surfaces 37 and 55 respectively, will urge the collets 30 and 50 axially inwardly whereupon the surface 24 will act against surface 36 to cause collapse of jaws 35, 35, followed by collapse of jaws 52, 52, with nut 70 adjusting radially of collets 30 and 50 during said collapse. When the nut has been tightened fully to the point where the tool 12 is securely retained by the collet 50, the tool is ready for use.

After usage and assuming that it is desired to remove the collet, it is merely necessary that the nut 14 be unscrewed with respect to the member 10. During such unscrewing action and with the tool in place, there can be no radial collapse of either the jaws 35, 35 or the jaws 52, 52 since this radial collapse will be obviated by the presence of the positioned tool 12. Accordingly and with collapse obviated as just described, the inclined surface 65 will engage the complementally inclined surface 36 and will cause collet to be unseated with respect to member 10. Upon collet 30 being unseated, it is believed manifest that collet 50 will also be unseated and will be carried therewith. When the collets 30 and 50 have been unseated and removed, the tool 12 may be removed from bore 57, and at this time collets 30 and 50 may be separated from ring 14 merely by moving the collet 30 axially of nut 14 so as to cause collapse of gripping jaws 35, 35 and 52, 52 upon movement of collet 30 past the smaller diameter point of surface 65. At this time it is merely necessary to separate the collets 30 and 50, at which time new collets may be used as above described.

While a full and complete description of the invention has been set forth above in accordance with the dictates of the patent statutes, it is to be understood that the invention is not intended to be limited to the specific embodiment illustrated herein and accordingly, where appropriate, equivalents may be substituted as desired.

Accordingly, modifications of the invention may be resorted to without departing from the spirit hereof, or of the scope of the appended claims.

This application is continuation, in part, of copending application Serial Number 689,444, filed October 10, 1957, by George A. Sima.

What is claimed is:

1. A collet chuck mechanism of the character described, comprising; a tool holder adapted to cooperate with a machine tool and having a tapered socket in one end thereof; a first collet insertable into said socket and formed with a plurality of gripping jaws that flex inwardly as said collet is pressed into said socket; a second collet concentrically telescoped within said first collet and formed with a plurality of gripping jaws that flex inwardly as said second collet is telescoped into said first collet; a compression member shiftable axially of said holder and adapted to press said second collet telescopically of said first collet while simultaneously pressing said first collet into said socket.

2. A collet chuck mechanism of the character described, comprising; a tool holder adapted to cooperate with a machine tool and having a tapered socket in one end thereof; a first collet insertable into said socket and formed with a plurality of gripping jaws that flex inwardly as said collet is pressed into said socket; a second collet concentrically telescoped within said first collet and formed with a plurality of gripping jaws that flex inwardly as said second collet is telescoped into said first collet; a compression member shiftable axially of said holder and adapted to press said second collet telescopically of said first collet while simultaneously pressing said first collet into said socket; said compression member being defined by a circular body and a ring member shiftably carried thereby; said ring member having axially spaced concentric tapered surfaces that respectively engage said first and second collets and urge the same axially of said tool holder upon movement of said body axially of said holder.

3. A collet chuck mechanism of the character described, comprising; a tool holder adapted to cooperate with a machine tool and having a tapered socket in one end thereof; a first collet insertable into said socket and formed with a plurality of gripping jaws that flex inwardly as said collet is pressed into said socket; a second collet concentrically telescoped within said first collet and formed with a plurality of gripping jaws that flex inwardly as said second collet is telescoped into said first collet; a compression member shiftable axially of said holder and adapted to press said second collet telescopically of said first collet while simultaneously pressing said first collet into said socket; and means for mechanically unseating said first collet from said socket upon axial movement of said compression.

4. The device of claim 3, further characterized by the fact that said means include a radially inwardly projecting ring carried by said compression member; said ring having an internal diameter smaller than said maximum normal diameter of said first collet but larger than the maximum diameter of said first collet when said gripping jaws thereof are collapsed.

5. A compression member for use in seating telescoped collets in a tool holder having a tapered socket in one end, comprising; a tubular body; a first ring carried by said body and extending radially inwardly thereof; concentric, axially spaced tapered surfaces defined by said first ring and complementally engaging said collets; means for limiting movement of said first ring axially of said body; said first ring being shiftable radially of said body, and means on said body for mounting the same in axially shiftable relationship on said tool body.

6. A compression member for use in seating telescoped collets in a tool holder having a tapered socket in one end, comprising; a tubular body; a first ring carried by said body and extending radially inwardly thereof; concentric, axially spaced tapered surfaces defined by said first ring and complementally engaging said collets; means for limiting movement of said first ring axially of said body; said first ring being shiftable radially of said body, and a second ring carried by said body and extending radially inwardly thereof adjacent said first ring.

7. The device of claim 6, further characterized by the fact that said second ring has its inner peripheral edge tapered with respect to the axis thereof.

8. The device of claim 7, further characterized by the fact that said last-mentioned means include a threaded connection between said holder and said body.

References Cited in the file of this patent

UNITED STATES PATENTS

| | | |
|---|---|---|
| 1,582,445 | Border | Apr. 27, 1926 |
| 2,272,185 | Chittenden | Feb. 10, 1942 |